United States Patent
Bergman et al.

(10) Patent No.: US 8,176,422 B2
(45) Date of Patent: May 8, 2012

(54) METHOD FOR ALIGNING DEMONSTRATED USER ACTIONS WITH EXISTING DOCUMENTATION

(75) Inventors: Lawrence D. Bergman, Mt. Kisco, NY (US); Vittorio Castelli, Croton-on-Hudson, NY (US); Eugene Rogan Creswick, Corvallis, OR (US); Tessa A. Lau, New York, NY (US); Daniel A. Oblinger, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 2255 days.

(21) Appl. No.: 10/993,377

(22) Filed: Nov. 19, 2004

(65) Prior Publication Data
US 2006/0112322 A1 May 25, 2006

(51) Int. Cl.
*G06F 3/00* (2006.01)
(52) U.S. Cl. ........ 715/708; 715/705; 715/707; 715/709; 715/710
(58) Field of Classification Search .................. 715/705, 715/707, 708, 709, 710; 434/118; 717/151
See application file for complete search history.

(56) References Cited

U.S. PATENT DOCUMENTS

| | | | | |
|---|---|---|---|---|
| 5,175,812 A * | 12/1992 | Krieger | ........................ | 715/708 |
| 5,481,667 A * | 1/1996 | Bieniek et al. | ................ | 715/709 |
| 5,483,632 A * | 1/1996 | Kuwamoto et al. | ........... | 715/708 |
| 5,493,658 A * | 2/1996 | Chiang et al. | ................ | 715/709 |
| 5,715,415 A * | 2/1998 | Dazey et al. | .................. | 715/708 |
| 5,781,191 A * | 7/1998 | Mayuzumi et al. | ........... | 715/705 |
| 5,825,356 A * | 10/1998 | Habib et al. | .................. | 715/712 |
| 6,259,445 B1 * | 7/2001 | Hennum et al. | ............... | 715/709 |
| 6,262,730 B1 * | 7/2001 | Horvitz et al. | ................ | 715/707 |
| 6,601,012 B1 * | 7/2003 | Horvitz et al. | ................ | 702/150 |
| 7,000,187 B2 * | 2/2006 | Messinger et al. | ............ | 715/705 |
| 7,233,933 B2 * | 6/2007 | Horvitz et al. | .................. | 706/21 |
| 7,640,548 B1 * | 12/2009 | Yu et al. | ........................ | 718/106 |

OTHER PUBLICATIONS

Tessa Lau et al.; Sheepdog: Learning Procedures for Technical Support; IUI '04; Jan. 13-16, 2004, Madeira, Funchal, Portugal, 15 pages.

* cited by examiner

*Primary Examiner* — Doon Chow
*Assistant Examiner* — Grant D Johnson
(74) *Attorney, Agent, or Firm* — Tutunjian & Bitetto, P.C.; Brian P. Verminski

(57) ABSTRACT

There is provided an apparatus for aligning document actions specified in a documented procedure with demonstrated user actions. The apparatus includes an alignment device for computing an alignment between the document actions and the demonstrated user actions based on at least one similarity metric.

3 Claims, 3 Drawing Sheets

METHOD FOR ALIGNING DEMONSTRATED USER ACTIONS WITH EXISTING DOCUMENTATION

FIELD OF THE INVENTION

The present invention generally relates to documented procedures and, more particularly, to a method and apparatus for aligning steps in a documented procedure with demonstrated user actions.

BACKGROUND OF THE INVENTION

Technical support procedures are typically very complex. Users often have trouble following printed instruction describing how to perform these procedures.

In a study to investigate how end users perform technical support procedures while following printed directions, the mouse and keyboard actions of eleven subjects were captured as they followed five pages of written instructions (including screenshots). These instructions were copied from IBM's internal technical support website. The instructions described a procedure to modify and verify the Domain Name Server (DNS) configuration of a laptop computer. Each subject was presented with a different initial configuration, with the eleven configurations chosen to be distinct and to span the space of possible procedure pathways. The subjects were instructed to follow the directions to restore the system to the correct configuration.

Nearly all participants, regardless of MICROSOFT WINDOWS knowledge, had difficulties following printed instructions. In particular, it was noted that people often had difficulty translating from text on the page to widgets on the screen. Moreover, it was noted that people tended to miss portions of the instructions, particularly separate portions of text that described branches of a conditional instruction. Also, it was noted that people had difficulty following out-of-order instructions and screenshots, especially those that were not identical to what they saw on the screen.

Accordingly, it would be desirable and highly advantageous to have a method and apparatus for aligning document actions specified in a documented procedure with corresponding demonstrated user actions, so as provide a guided approach to technical support procedures.

SUMMARY OF THE INVENTION

These and other drawbacks and disadvantages of the prior art are addressed by the present invention, which is directed to a method and apparatus for aligning document actions specified in a documented procedure with corresponding demonstrated user actions.

According to an aspect of the present invention, there is provided an apparatus for aligning document actions specified in a documented procedure with demonstrated user actions. The apparatus includes an alignment device for computing an alignment between the document actions and the demonstrated user actions based on at least one similarity metric.

According to another aspect of the present invention, there is provided an apparatus for guiding user actions with respect to a documented procedure displayed on a user interface. The documented procedure has a plurality of steps specified therein. The apparatus includes an alignment device, a highlighting device, and a scrolling device. The alignment device is for computing an alignment between the document actions and the demonstrated user actions based on at least one similarity metric. The highlighting device, connected in signal communication with the alignment device, is for visually highlighting on the user interface at least a portion of a step in the documented procedure based on the alignment computed by the alignment device. The scrolling device, connected in signal communication with the alignment device, is for automatically scrolling through each of the plurality of steps of the documented procedure on the user interface based on the alignment computed by the alignment device.

According to yet another aspect of the present invention, there is provided a method for aligning document actions specified in a documented procedure with demonstrated user actions. The method includes the step of computing an alignment between the document actions and the demonstrated user actions based on at least one similarity metric.

According to a further aspect of the present invention, there is provided a method for guiding user actions with respect to a documented procedure displayed on a user interface. The documented procedure has a plurality of steps specified therein. The method includes the steps of computing an alignment between the document actions and the demonstrated user actions based on at least one similarity metric, visually highlighting on the user interface at least a portion of a step in the documented procedure based on the computed alignment, and automatically scrolling through each of the plurality of steps of the documented procedure on the user interface based on the computed alignment.

These and other aspects, features and advantages of the present invention will become apparent from the following detailed description of exemplary embodiments, which is to be read in connection with the accompanying drawings.

BRIEF DESCRIPTION OF THE DRAWINGS

The present invention may be better understood in accordance with the following exemplary figures, in which.

DETAILED DESCRIPTION OF PREFERRED EMBODIMENTS

Figure 1:
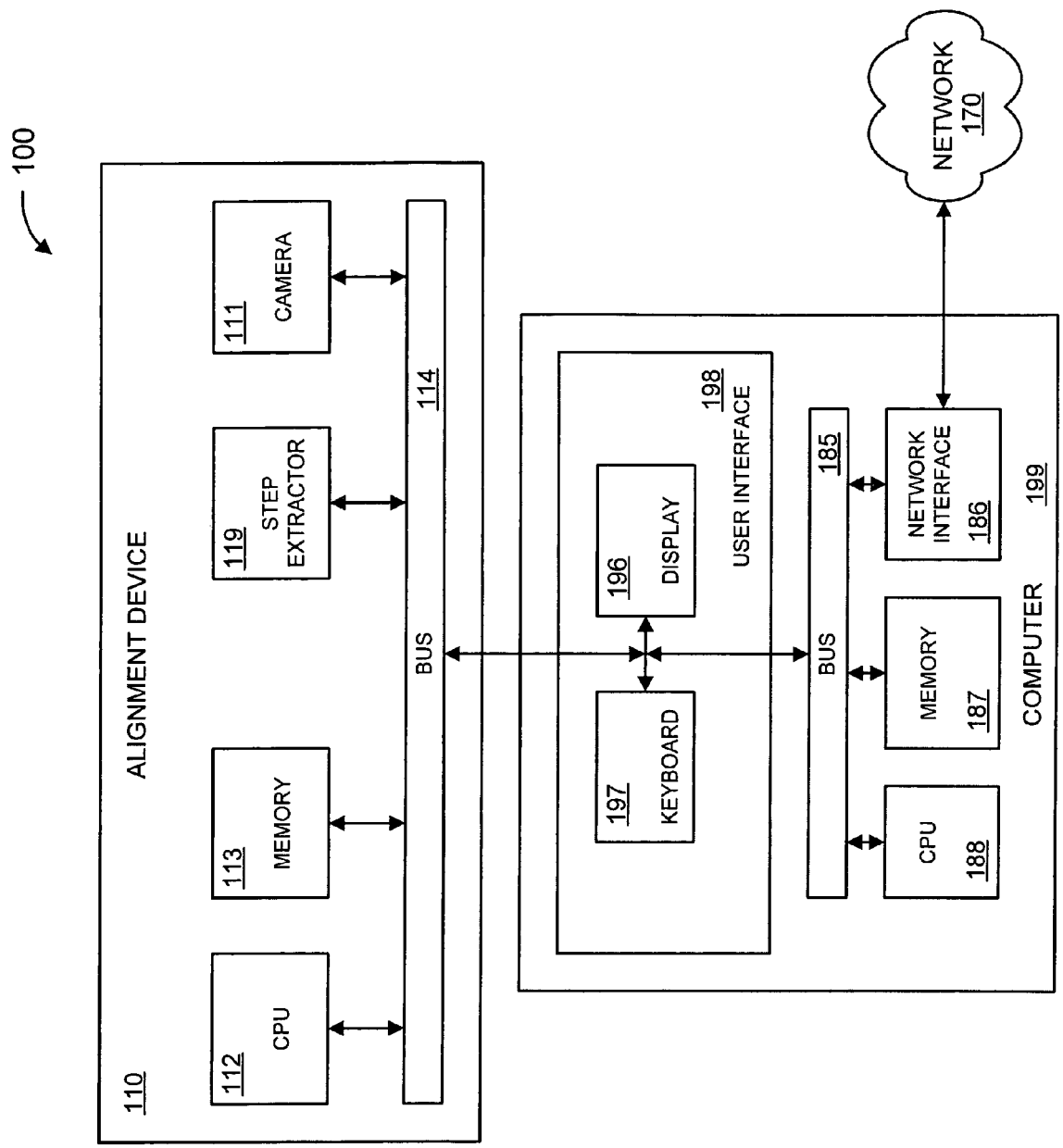
FIG. 1 is a block diagram illustrating a system 100 for aligning document actions specified in a documented procedure with corresponding demonstrated user actions, according to an illustrative embodiment of the present invention.

The present invention is directed to a method and apparatus for aligning document actions specified in a documented procedure with corresponding demonstrated user actions.

A brief description will now be given of an implementation of the present invention to illustrate some of the many attendant advantages and features of the present invention. According to one illustrative embodiment of the present invention, a user opens an online documentation file, such as an operating manual or an IBM Redbook, turns to a particular documented procedure and, as the user performs the procedure, the corresponding text and/or graphics are highlighted and advance (e.g., scrolling to the next step, next page, etc.) along with user. Optionally, the next step to be taken in the documentation may be highlighted. In the likely event the user is performing the procedure using a user interface, the highlighting and advancing may be performed directly in the user interface.

Thus, in accordance with the present invention, novice users could benefit from having annotations explaining the key concepts in the procedure, and experts could benefit from partial automation that helps them avoid mistakes. Several ways have been identified in which an interactive help system could be an improvement over printed instructions. For example, in accordance with the principles of the present invention, the present invention may advantageously employ the following features to help guide an individual to perform steps in a documented procedure: automatically highlighting the target widget on the screen; automatically detecting and branching on conditionals; and providing a visual indicator of which step the user is currently "up to" in the procedure. It is to be appreciated that the present invention is not limited to the preceding features to aid a user in performing a documented procedure and, thus, given the teachings of the present invention provided herein, other features may also be employed while maintaining the spirit of the present invention.

It is to be appreciated that as used herein the words "highlighting" and "highlight" refer to any visual, audible, and tactile indication or cue that may be used to identify (or make stand out) an item of interest in a documented procedure. Such items may include, but are not limited to, a step or portion thereof, a word, a phrase, a symbol, a hyperlink, a graphic, and any other item that may be found in a documented procedure. It is to be further appreciated that the present invention is not limited to the preceding ways in which to identify an item, or to the items specified and, thus, other ways and other items may be used to provide "highlighting" as used herein, while maintaining the spirit and scope of the present invention.

The present description illustrates the principles of the present invention. It will thus be appreciated that those skilled in the art will be able to devise various arrangements that, although not explicitly described or shown herein, embody the principles of the invention and are included within its spirit and scope.

All examples and conditional language recited herein are intended for pedagogical purposes to aid the reader in understanding the principles of the invention and the concepts contributed by the inventor to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means that can provide those functionalities as equivalent to those shown herein.

FIG. 1 is a block diagram illustrating a system 100 for aligning document actions specified in a documented procedure with corresponding demonstrated user actions, according to an illustrative embodiment of the present invention.

The system 100 is intended to cooperate with (or be included in) a computer 199 that is to be used to perform the documented procedure. For example, the computer 199 may simply be a desktop computer, a laptop computer, a personal digital assistant, an electronic tablet, and so forth that is capable of displaying a documented procedure for a user to execute. The computer 199 may optionally have the capability to access a network (e.g., the Internet, a company intranet, etc.) to download a documented procedure. Thus, it is to be appreciated that the documented procedure may be located locally or remotely with respect to the computer 199. The computer 199 includes one or more processors (hereinafter "processor") 188, one or more memories (hereinafter "memory") 187, a network interface 186, and one or more buses (hereinafter "bus") 185. The computer 199 further includes a user interface 198 for allowing a user to interact with the documented procedure. The user interface 198 may include a keyboard or keypad (hereinafter "keyboard") 197 and a display 196. The display 196 may be a touch-screen display capable of receiving user inputs via the display. The present invention is not limited to interacting with only computers having the configuration as shown in FIG. 1 and, thus, other computers, computing devices and corresponding configurations may also be employed in accordance with the present invention while maintaining the spirit of the present invention.

The system 100 includes an alignment device 110. The alignment device 110 may receive inputs from the user interface 198 or may include a camera (also interchangeably referred to herein as "imaging device") 111 or other device for use in determining demonstrated user actions. The alignment device 110 preferably further includes one or more processors (hereinafter "processor") 112, one or more memories (hereinafter "memory") 113, and one or more buses (hereinafter "bus") 114 for interconnecting the elements of the alignment device 110. Additionally, the alignment device 110 may include a step extractor 119 for extracting steps from a documented procedure. The step extractor 119 may include a scanner and/or other device capable of optical character recognition, a parser, a memory for storing words/phrases/etc. that may be compared against parsed words/phrases/etc., and/or so forth.

The alignment device 110 computes an alignment between the document actions specified in a documented procedure and corresponding demonstrated user actions. Based on the computed alignment, a step or portion of a step (e.g., word(s), graphic(s), and so forth) in the documented procedure is highlighted so that the user can identify where he or she is (e.g., which step is the current step for which a user action needs to be taken) within the documented procedure. Optionally, a next step may also be highlighted, preferably in a different manner than the current step. The alignment may be used to automatically scroll through the procedure as the user progresses there through.

It is to be appreciated that the connection configuration depicted in FIG. 1 is merely illustrative and, thus, given the teachings of the present invention provided herein, one of ordinary skill in the related art will contemplate these and other connection configurations and other elements that may be employed with respect to a system for aligning document actions specified in a documented procedure with corresponding demonstrated user actions while maintaining the spirit of the present invention.

Figure 2:
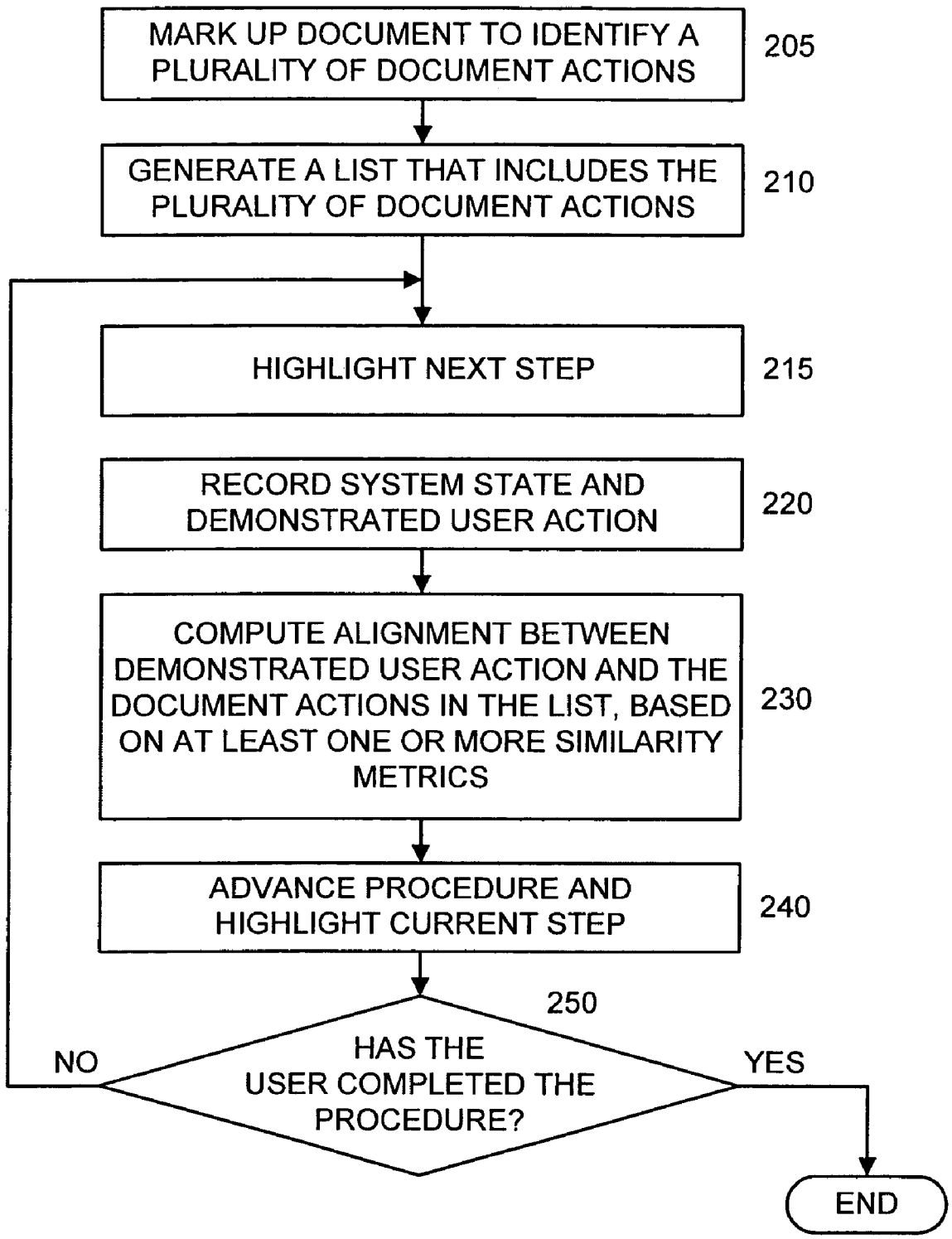
FIG. 2 is a flow diagram illustrating a method for aligning document actions specified in a documented procedure with corresponding demonstrated user actions, according to an illustrative embodiment of the present invention.

FIG. 2 is a flow diagram illustrating a method for aligning document actions specified in a documented procedure with corresponding demonstrated user actions, according to an illustrative embodiment of the present invention.

The document is marked up to identify a plurality of document actions (step 205). A document action is an action expected or mandated to be taken with respect to a given document. A list that includes the plurality of document actions is generated (step 210). Steps 205 and 210 are preferably performed prior to a user attempting to perform the steps specified in the documented procedure.

The next step in the procedure is highlighted (step 215). The system state and demonstrated user action are recorded (step 220). An alignment is computed between the demonstrated user action and the document actions in the list based on at least one or more similarity metrics (step 230). Based on the alignment, the procedure may be advanced, if necessary, and the most likely document action in the procedure (i.e., the current document action to be taken by the user) is highlighted (step 240).

It is then determined whether or not the user has completed the procedure (step 250). If the user has not completed the procedure, then the method returns to step 215 to highlight the next step in the procedure. Preferably, the next step is highlighted in a manner different from that employed with respect to the current step, so as to avoid user confusion. Otherwise, if the user has completed the procedure, then the method is terminated. It is to be appreciated that highlighting with respect to the current step and/or the next step may involve highlighting a whole textual and/or graphical description of a step, a portion thereof, an element of the user interface (including, but not limited to, action buttons (e.g., cut, paste, save, etc.), and so forth.

Figure 3:
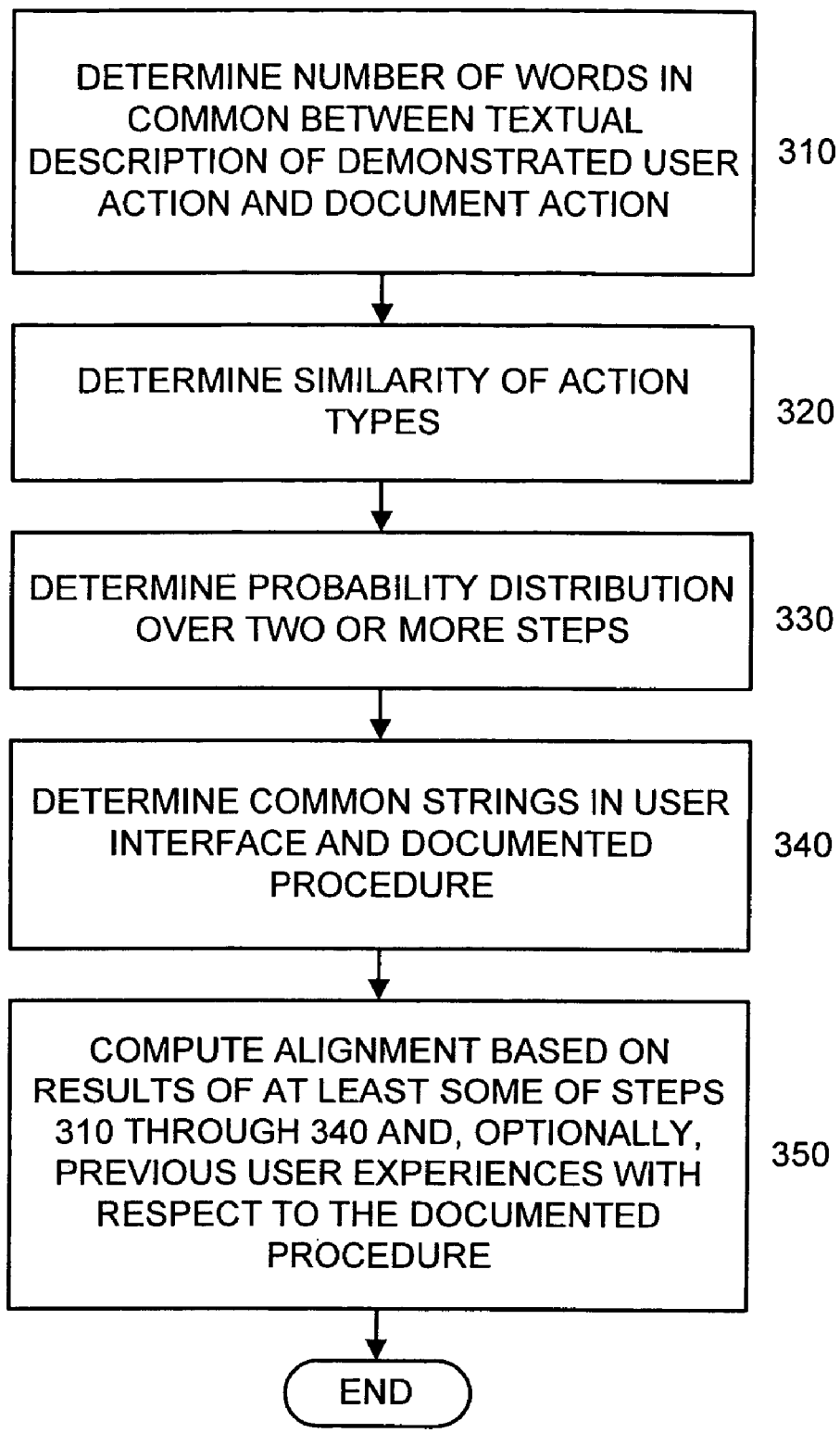
FIG. 3 is a flow diagram further illustrating step 230 of FIG. 2, according to an illustrative embodiment of the present invention.

FIG. 3 is a flow diagram further illustrating step 230 of FIG. 2, according to an illustrative embodiment of the present invention. Step 230 can also be considered as computing a similarity between a user-demonstrated state/action and steps in a documented procedure (document actions, as specified in the list). According to an illustrative embodiment of the present invention, similarity may be based on a probabilistic combination of similarity parameters.

The number of words in common between a textual description of a demonstrated user action and document action is determined (step 310).

The similarity of the action types involved (e.g., clicking button and clicking checkbox are more similar than typing) with respect to the demonstrated user action and the document actions is determined (step 320).

A probability distribution (e.g., including, but not limited to, a Gaussian distribution) over two or more steps is determined (step 330). In such an approach, the next step in temporal order is usually the most likely.

Any common strings in the user interface (e.g., button labels) and the documented procedure are determined (step 340).

An alignment based on one or more of steps 310 through 340 is then calculated (step 350). It is to be appreciated that the alignment may also be based on experiences of previous users, using any of the results of steps 310 through even 350 for the previous users.

It is to be appreciated that the present invention is not limited to the preceding alignment or similarity parameters and, thus, given the teachings of the present invention provided herein, other parameters may also be employed to determine alignment or similarity while maintaining the spirit of the present invention.

These and other features and advantages of the present invention may be readily ascertained by one of ordinary skill in the pertinent art based on the teachings herein. It is to be understood that the teachings of the present invention may be implemented in various forms of hardware, software, firmware, special purpose processors, or combinations thereof.

Most preferably, the teachings of the present invention are implemented as a combination of hardware and software. Moreover, the software is preferably implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present invention is programmed. Given the teachings herein, one of ordinary skill in the pertinent art will be able to contemplate these and similar implementations or configurations of the present invention.

Although the illustrative embodiments have been described herein with reference to the accompanying drawings, it is to be understood that the present invention is not limited to those precise embodiments, and that various changes and modifications may be effected therein by one of ordinary skill in the pertinent art without departing from the scope or spirit of the present invention. All such changes and modifications are intended to be included within the scope of the present invention as set forth in the appended claims.

What is claimed is:

1. A method for aligning document actions specified in a documented procedure with demonstrated user actions, comprising the steps of:

computing an alignment between the document actions and the demonstrated user actions based on at least one similarity metric, wherein the demonstrated user actions are performed with respect to a user interface and the at least one similarity metric is based on common strings in the user interface and the documented procedure, and identifying a next step in the documented procedure based on the alignment.

2. The method of claim 1, wherein the documented procedure is displayed on a user interface, and the method further comprises the step of providing an identification of the next step to the user interface for use in highlighting the next step on the user interface.

3. A method for aligning document actions specified in a documented procedure with demonstrated user actions, comprising the steps of:

computing an alignment between the document actions and the demonstrated user actions based on at least one similarity metric, wherein the demonstrated user actions are performed with respect to a user interface, and the at least one similarity metric is based on common strings in the user interface and the documented procedure as well as a probability distribution over at least two steps of the documented procedure.

* * * * *